United States Patent
Zayets et al.

(10) Patent No.: US 8,750,666 B2
(45) Date of Patent: Jun. 10, 2014

(54) OPTICAL DEVICE USING A PLASMONIC WAVEGUIDE, AND OPTICAL ISOLATOR

(71) Applicant: National Institute of Advanced Industrial Science and Technology, Tokyo (JP)

(72) Inventors: Vadym Zayets, Tsukuba (JP); Koji Ando, Tsukuba (JP); Hidekazu Saito, Tsukuba (JP); Shinji Yuasa, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 13/747,175

(22) Filed: Jan. 22, 2013

(65) Prior Publication Data

US 2014/0010509 A1    Jan. 9, 2014

(30) Foreign Application Priority Data

Jul. 4, 2012 (JP) ................................ 2012-150665

(51) Int. Cl.
*G02B 6/10* (2006.01)

(52) U.S. Cl.
USPC ........... 385/131; 385/129; 385/130; 385/141; 385/142

(58) Field of Classification Search
USPC ......... 385/129, 130, 131, 132, 141, 142, 143, 385/144
See application file for complete search history.

(56) References Cited

U.S. PATENT DOCUMENTS

| | | | | |
|---|---|---|---|---|
| 7,417,219 B2 * | 8/2008 | Catrysse et al. | | 250/234 |
| 7,649,597 B2 * | 1/2010 | Ikeno et al. | | 349/114 |
| 2009/0274016 A1 | 11/2009 | Katsuragawa | | |

FOREIGN PATENT DOCUMENTS

| | | |
|---|---|---|
| JP | 2005-315993 A | 11/2005 |
| JP | 2007-213004 A | 8/2007 |
| WO | WO 2009/067540 A1 | 5/2009 |

OTHER PUBLICATIONS

Debnath et al., "Thermal annealing of magneto-optical (Cd,Mn)Te waveguides for optical isolators with wider operational wavelength range", App. Phys. Lett. 87, (2005), pp. 1-3.
Zaets et al., "Optical Waveguide Isolator Based on Nonreciprocal Loss/Gain of Amplifier Covered by Ferromagnetic Layer", IEEE Photonics Technology Letters, vol. 11, No. 8, Aug. 1999, pp. 1012-1014.
Zayets et al., "Enhancement of the transverse non-reciprocal magneto-optical effect", Journal of Applied Physics 111, (2012), pp. 1-7.
Zayets et al., "Isolation effect in ferromagnetic-metal/semiconductor hybrid optical waveguide", App. Phys. Lett. 86, (2005), pp. 1-3.
Zayets et al., "Magnetization-dependent loss in an (Al,Ga)As optical waveguide with an embedded Fe micromagnet", Optics Letters, vol. 35, No. 7, Apr. 1, 2010, pp. 931-933.
Zayets et al., "Optical Isolator Utilizing Surface Plasmons", Materials 2012, 5, pp. 857-871.

* cited by examiner

*Primary Examiner* — Jennifer Doan
(74) *Attorney, Agent, or Firm* — Birch, Stewart, Kolasch & Birch, LLP

(57) ABSTRACT

An optical device having a plasmonic waveguide, in which the plasmonic waveguide has a layered structure of at least three layers that a ferromagnetic metal layer, a first dielectric layer, and a second dielectric layer are layered in this order, in which the first and second dielectric layers are layers that allow light to be transmitted therethrough, and in which a refractive index of the second dielectric layer is higher than a refractive index of the first dielectric layer; and an optical isolator, having the optical device.

20 Claims, 10 Drawing Sheets

OPTICAL DEVICE USING A PLASMONIC WAVEGUIDE, AND OPTICAL ISOLATOR

FIELD OF THE INVENTION

The present invention relates to an optical device using a novel plasmonic waveguide, and an isolator which is a representative example of the optical device.

BACKGROUND OF THE INVENTION

In optical communication systems and other optical application systems, optical devices, such as optical isolators, are indispensable components. For example, an optical isolator is utilized to prevent reflected light, which is reflected and back-traveling, from entering or being incident to optical elements. It is impossible to allow optical elements, such as high-speed optical amplifiers and high-speed laser diodes, to operate normally, without any optical isolators.

Integration of optical elements into optical integrated circuits (OICs) is necessary to lower production costs and to enhance the performance of high-speed optical data processing for high-speed optical networks. In further integration of the optical integrated circuits, reflected light that is reflected off from optical components and back-traveling causes unstable operation of a device in interest, resulting in a conspicuous problem. Optical isolators have the property of allowing light to be transmitted therethrough only in one direction, and have the function of blocking light reflected and coming back. Thus, it is important to integrate optical isolators into OICs. However, such the optical isolators are one of the optical components that are not integrated into OICs. At present, since no OICs having optical isolators integrated therein exist, OICs having optical isolators integrated therein will make a big market in the future.

Optical isolators require magneto-optical (MO) materials. Existing commercially-available optical isolators use transparent magnetic garnets. It is difficult to grow the magnetic garnets on substrates, such as Si, GaAs, and InP, which are used as substrates for OICs; however, some methods are reported. There are reports that optical isolators are fabricated on the substrates, by a method in which a magnetic garnet is bonded onto a semiconductor substrate, or by a method in which a magnetic garnet is sputtered onto a Si substrate. In addition, the inventors of the present invention have fabricated optical isolators on GaAs substrates using diluted magnetic semiconductors, such as CdMnTe and CdMnHgTe (see M. C. Debnath, V. Zayets, and K. Ando, "Thermal annealing of magneto-optical (Cd,Mn)Te waveguide for optical isolator with wider operation wavelength range", Appl. Phys. Lett., 87, 091112 (2005), and JP-A-2005-315993 ("JP-A" means unexamined published Japanese patent application)). However, there is no report of any example in which other optical components are integrated on those semiconductor substrates having optical isolators integrated therein.

Magneto-optical properties of magnetic garnets and diluted magnetic semiconductors are affected by the quality of crystals of each of those. When the quality of magnetic garnets or diluted magnetic semiconductors is low, their magneto-optical constants become low to result in a high optical loss. Even if the crystal quality of those magneto-optical materials is maintained during the step of integrating an optical isolator into an OIC, the crystal quality of those magneto-optical materials becomes worse upon the step of integrating other optical components thereinto. This is the reason why any optical isolators, which are fabricated using magnetic garnets or diluted magnetic semiconductors, are not integrated into commercially-available OICs.

Ferromagnetic metals are expected to be favorable as magneto-optical materials for optical isolators. This is because ferromagnetic metals have high magneto-optical constants. Furthermore, the ferromagnetic metal fabrication technique, which is an important matter when fabricating OICs having optical isolators integrated thereinto, is compatible with the OIC fabrication technique. That is, since sputtering and lift-off deposition, which are generally used for OICs, can be applied to ferromagnetic metals, the quality of the ferromagnetic metals does become worse in the OIC fabrication process.

However, use of any of ferromagnetic metals has a drawback. The drawback is that ferromagnetic metals significantly absorb light. There is a method for solving this problem. The method is to compensate or off set the loss caused by the optical absorption by a ferromagnetic metal, by an optical gain of a semiconductor optical amplifier. The inventors of the present invention already proposed this method (W. Zaets and K. Ando, "Optical waveguide isolator based on non-reciprocal loss/gain of amplifier covered by ferromagnetic layer", IEEE Photonics Technology Letters, vol. 11, pp. 1012-1014, August 1999), and we already realized the method (see V. Zayets and K. Ando, "Isolation Effect in Ferromagnetic-Metal/Semiconductor Hybrid Optical Waveguide", Applied Physics Letter, vol. 86, pp. 261105, 2005.06). This type of optical isolator exhibits an excellent isolation function, and exhibits a low optical insertion loss. However, since its operation requires a large electric current of about 100 mA, such a large electric current is not acceptable for OICs. Due to this, it is impossible to have this type of optical isolator be integrated into OICs.

Further, the inventors of the present invention have studied on (Al,Ga)As optical waveguides having Fe embedded therein, which is a ferromagnetic metal (see V. Zayets, H. Saito, S. Yuasa, and K. Ando, "Magnetization-dependent loss in (Al,Ga)As Optical Waveguide with an Embedded Fe micromagnet", Optics Letters, Vol. 35, pp. 931-933, 2010).

With respect to optical isolators, searching related to this application has been carried out. As a result, patent documents such as those below are found. WO 2009/067540 A1 discloses an optical device having a groove structure of a metal (Au, Cu, Ag), and using surface plasmons. Further, JP-A-2007-213004 discloses a device having a fine-particle arrangement layer including metal magnetic fine-particles. In the device, magnetization is generated by applying an external magnetic field to the metal magnetic fine-particles, and linearly polarized light is made incident in the device, so that a magneto-optical effect is caused by the interaction between the incident light to the metal magnetic fine-particles and the surface plasmon oscillation of the metal.

As described above, although there is a need to integrate efficient optical isolators or the like into optical integrated circuits, conventionally it was difficult to integrate optical devices, represented by optical isolators, into optical integrated circuits. To integrate optical isolators or the like into OICs, it is desirable to use, as a substrate, Si, InP, or GaAs, each of which is a semiconductor substrate. Furthermore, OICs having optical isolators integrated therein using such a substrate, needs to have properties of a high optical isolation and a low insertion loss.

In recent years, optical devices using plasmons have been proposed. The optical devices are also called plasmonic devices, and are devices which are ones of applications of plasmons excited, by allowing light or an electron beam to enter a metal. Optical waveguides using plasmons are called plasmonic waveguides or plasmon waveguides.

FIG. 12 shows the intensity of plasmons propagating along an interface between a metal and a dielectric. FIG. 12 is a diagram schematically showing a state in which the plasmons propagate along the interface between the dielectric and the metal. A wave-like arrow schematically represents the plasmons, and a transversely convex solid line represents the distribution of the plasmons.

Since light is tightly confined in the vicinity of the interface between the metal and the dielectric, the plasmons are used in many cases, for example, of integrated circuits where optical elements are integrated densely, or when light needs to be focused on a very small area, e.g. the cases of magneto-optical recording or medical field applications.

In the case of plasmons, since the optical intensity is partially distributed inside of the metal and inside of the dielectric, the plasmons always experience an optical loss. However, the optical loss of the plasmons is quite lower than the optical loss for light propagating through a bulk metal.

FIG. 13 is a graph showing propagation distance where plasmons attenuate to 1/e (vertical axis) as a function of a wavelength (horizontal axis, 0.7 µm to about 1.6 µm), in the case of using a low-resistance metal, such as Au and Cu. Those shown in FIG. 13 correspond to the case where the metal is Au and the dielectric is the air, and the case where the metal is Cu and the dielectric is the air, respectively in FIG. 12. In the cases of these metals, the propagation distance where plasmons attenuate to 1/e is long, about 200 to 500 µm. Due to this, these metals are used for circuits using plasmons. However, Au and Cu are not ferromagnetic metals. Fabrication of an optical isolator requires a ferromagnetic metal.

The cases of ferromagnetic metals Fe, Ni, Co, or the like will be described. FIG. 14 is a graph showing propagation distance where plasmons attenuate to 1/e (vertical axis) as a function of a wavelength (horizontal axis, 0.7 µm to about 1.6 µm), in the case of using a ferromagnetic metal, Fe, Ni, and Co. The curves shown in FIG. 14 show, in the order from the top of those, the case where the ferromagnetic metal is Ni and the dielectric is the air (Ni/air), the case where the ferromagnetic metal is Co and the dielectric is the air (Co/air), the case where the ferromagnetic metal is Fe and the dielectric is the air (Fe/air), the case where the ferromagnetic metal is Co and the dielectric is MgO (Co/MgO), and the case where the ferromagnetic metal is Co and the dielectric is AlGaAs (Co/AlGaAs). Since these ferromagnetic metals are high in resistance, the optical loss of the plasmons is also high, and the propagation distance where the plasmons attenuate to 1/e is significantly shorter than that of the cases of plasmons using a metal Au or Cu. The propagation distance is 50 µm at the longest, in the case where the ferromagnetic metal is Ni and the dielectric is the air. However, the high optical loss in this case can be resolved by shortening a device length. Since the magneto-optical constants of the ferromagnetic metals are high, even if the propagation distance where plasmons attenuate to 1/e is short, the plasmons can achieve a high optical isolation and a low insertion loss.

The magneto-optical (MO) figure-of-merit (hereinafter, also referred to as FoM) represents a ratio of optical isolation to insertion loss, and can be represented by the following equation:

$$FoM = \frac{isolation}{loss} = \frac{loss_{forward} - loss_{backward}}{(loss_{forward} + loss_{backward})/2}$$

The FoM indicates the performance or ability of plasmons to provide optical isolation corresponding to a value of required low insertion loss. The magneto-optical figure-of-merit is defined by the above equation, and thus is expressed in unit of %, but may exceed 100%. For example, the FoM is represented as follows: 0.3=30%, 1=100%, and 2=200%.

FIG. 15 is a graph showing a magneto-optical figure-of-merit (vertical axis), with a wavelength on the horizontal axis, in the case of plasmons propagating along the interface of Co/AlGaAs, Fe/air, Co/air, and Ni/air, respectively. A magnetic field is applied to perpendicularly to a propagation direction of the plasmons. In these four examples, the magneto-optical figure-of-merit is about 2 to 8%. Though these values are considerably favorable, there is a problem that the values are not yet sufficient to fabricate an efficient plasmonic optical isolator.

SUMMARY OF THE INVENTION

One aspect of the present invention resides in an optical device having a plasmonic waveguide, wherein the plasmonic waveguide has a layered structure of at least three layers in which a ferromagnetic metal layer, a first dielectric layer, and a second dielectric layer are layered in this order, wherein the first and second dielectric layers are layers that allow light to be transmitted therethrough, and wherein a refractive index of the second dielectric layer is higher than a refractive index of the first dielectric layer.

Another aspect of the present invention resides in an optical isolator, which comprises the above optical device that has an optical isolator function.

Other and further features and advantages of the invention will appear more fully from the following description, appropriately referring to the accompanying drawings.

DETAILED DESCRIPTION OF THE INVENTION

Figure 1:
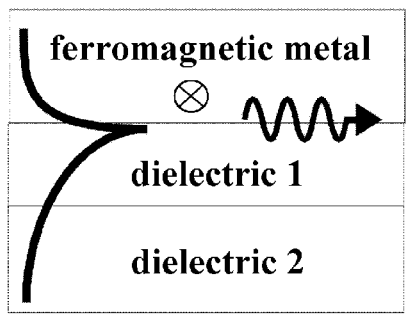
FIG. 1 is a diagram for explaining a basic structure of a plasmonic waveguide of the present invention.

The present invention is to provide, as a means for solving the above-described problems, an optical device, such as a plasmonic-type optical isolator, using a ferromagnetic metal as a magneto-optical material. The present invention is to make an optical loss low and to enhance a magneto-optical figure-of-merit, by using a plasmonic waveguide which comprises a double-layer dielectric which are largely different in a refractive index from each other.

According to the present invention, there are provided the following means:

(1) An optical device having a plasmonic waveguide, wherein the plasmonic waveguide has a layered structure of at least three layers in which a ferromagnetic metal layer, a first dielectric layer, and a second dielectric layer are layered in this order, wherein the first and second dielectric layers are layers that allow light to be transmitted therethrough, and wherein a refractive index of the second dielectric layer is higher than a refractive index of the first dielectric layer.

(2) The optical device according to item (1), wherein the first dielectric layer satisfies a predetermined thickness range condition that allows plasmons to propagate therethrough, in which a thickness of the first dielectric layer is thinner than a first cutoff thickness or thicker than a second cutoff thickness.

(3) The optical device according to item (1) or (2), wherein magnetization of the ferromagnetic metal layer is perpendicular to a propagation direction of plasmons.

(4) The optical device according to item (2), wherein the thickness of the first dielectric layer is 50 to 99% of the first cutoff thickness or 101 to 140% of the second cutoff thickness.

(5) The optical device according to any one of items (1) to (4), wherein the ferromagnetic metal layer is composed of a metallic material of any of Co, Fe, Ni, FeCo, FeNi, FeCoB, SmCo, or NdFeB, as a main component.

(6) The optical device according to any one of items (1) to (5), wherein the ferromagnetic metal layer is composed of Co, the first dielectric layer is composed of SiO$_2$, and the second dielectric layer is composed of Si, and a layer thickness of the first dielectric layer is 4 to 8 nm or 800 to 1,000 nm.

(7) The optical device according to any one of items (1) to (5), wherein the ferromagnetic metal layer is composed of Co, the first dielectric layer is composed of MgO or Al$_2$O$_3$, and the second dielectric is composed of Si, and a layer thickness of the first dielectric layer is 7 to 10 nm or 550 to 700 nm.

(8) The optical device according to any one of items (1) to (5), wherein the ferromagnetic metal layer is composed of Fe, the first dielectric layer is composed of SiO$_2$, and the second dielectric layer is composed of Si, and a layer thickness of the first dielectric layer is 6 to 9 nm or 600 to 800 nm.

(9) The optical device according to any one of items (1) to (8), wherein the ferromagnetic metal layer is of a rib type, to confine the plasmons in a transverse direction.

(10) The optical device according to any one of items (1) to (8), wherein one of the first dielectric layer and the second dielectric layer has a shape of convex to embed a rib-type portion formed by the convex in the other of the first and second dielectric layers, thereby to confine the plasmons in a transverse direction.

(11) An optical isolator, comprising the optical device according to any one of items (1) to (10), which has an optical isolator function.

An optical device of the present invention has a plasmonic waveguide, and is characterized in that the plasmonic waveguide has a layered structure of at least three layers in which a ferromagnetic metal layer, a first dielectric layer, and a second dielectric layer are layered in this order, that the first and second dielectric layers are layers, each of which allow light to be transmitted therethrough, and that a refractive index of the second dielectric layer is higher than a refractive index of the first dielectric layer. With respect to the layered structure of at least three layers in which the ferromagnetic metal layer, the first dielectric layer, and the second dielectric layer are layered in this order, it is enough that the said at least three layers are layered on top of one another in the said order so as to be in contact with each other, and other layer(s) may be provided on the top and/or bottom of these three layers. Although it is enough that the refractive index of the second dielectric layer differs from that of the first dielectric layer, it is preferred that the difference in refractive index be 0.5 or more.

In the present invention, it is preferable that the layered structure is one in which the first dielectric layer satisfies a predetermined thickness range condition that allows plasmons to propagate therethrough, and in which the first dielectric layer is thinner than a first cutoff thickness or thicker than a second cutoff thickness. In the present invention, the lower limit thickness of a numerical thickness range where plasmons cannot propagate is referred to as the first cutoff thickness, and the upper limit thickness is referred to as the second cutoff thickness. Namely, when the first dielectric layer satisfies the predetermined thickness range condition, plasmons can propagate therethrough, and it is preferable that the first dielectric layer is thinner than the first cutoff thickness (the thinner cutoff thickness) or thicker than the second cutoff thickness (the thicker cutoff thickness).

In the present invention, it is preferable that magnetization of the ferromagnetic metal layer is perpendicular to a propagation direction of the plasmons.

When the thickness of the first dielectric layer is thinner than the first cutoff thickness, it is preferred that the thickness of the first dielectric layer be 50% or more of the first cutoff thickness. Alternatively, when the thickness of the first dielectric layer is thicker than the second cutoff thickness, it is preferred that the thickness of the first dielectric layer be 140% or less of the second cutoff thickness. Specifically, it is preferred that the thickness of the first dielectric layer be from 50% to 99% of the first cutoff thickness, or more than 100% but not more than 140% of the second cutoff thickness. When the thickness of the first dielectric layer is thinner than the first cutoff thickness, it is more preferred that the thickness of the first dielectric layer be from 60% to 99% of the first cutoff thickness, since the magneto-optical figure-of-merit (MO-FoM) exceeds 10%. It is further preferred that the thickness of the first dielectric layer be from 86% to 99% of the first cutoff thickness, since the magneto-optical figure-of-merit (MO-FoM) exceeds 30%. It is still further preferred that the thickness of the first dielectric layer be from 95% to 99% of the first cutoff thickness, since the magneto-optical figure-of-merit (MOFoM) exceeds 50%. When the thickness of the first dielectric layer is thicker than the second cutoff thickness, it is more preferred that the thickness of the first dielectric layer be more than 100% but not more than 112% of the second cutoff thickness, since the magneto-optical figure-of-merit (MOFoM) exceeds 10%. It is further preferred that the thickness of the first dielectric layer be more than 100% but not more than 103% of the second cutoff thickness, since the magneto-optical figure-of-merit (MOFoM) exceeds 30%. It is still further preferred that the thickness of the first dielectric layer be more than 100% but not more than 101% of the second cutoff thickness, since the magneto-optical figure-of-merit (MOFoM) exceeds 50%.

It is preferred that the ferromagnetic metal layer of the present invention is composed of a material of any of Co, Fe, Ni, FeCo, FeNi, FeCoB, SmCo, and NdFeB, as its main component. Herein, the terms "main component" means that any one of the above-mentioned metals of Co, Fe, Ni, FeCo, FeNi, FeCoB, SmCo, and NdFeB is contained in the amount of 50 mass % or more, preferably 100 mass %, in the ferromagnetic metal layer. Not limited to those listed, any of other ferromagnetic metallic materials having similar properties can be used in the present invention.

As an example of the present invention, use can be made of a layered structure of: the ferromagnetic metal layer composed of Co; the first dielectric layer composed of $SiO_2$; and the second dielectric layer composed of Si. In this case, it is preferred that the layer thickness of the first dielectric layer be 4 to 8 nm or 800 to 1,000 nm.

As another example of the present invention, use can be made of a layered structure of: the ferromagnetic metal layer composed of Co; the first dielectric layer composed of MgO or $Al_2O_3$; and the second dielectric layer composed of Si. In this case, it is preferred that the layer thickness of the first dielectric layer be 7 to 10 nm or 550 to 700 nm.

As further another example of the present invention, use can be made of a layered structure of: the ferromagnetic metal layer composed of Fe; the first dielectric layer composed of $SiO_2$; and the second dielectric layer composed of Si. In this case, it is preferred that the layer thickness of the first dielectric layer be 6 to 9 nm or 600 to 800 nm.

In the present invention, plasmons can be confined in a transverse direction, by providing the ferromagnetic metal layer of a rib type.

In the present invention, plasmons can be confined in the transverse direction, by forming one of the first dielectric layer and the second dielectric layer in a shape of convex to embed a rib-type portion forming the convex in the other of the second and first dielectric layers.

The optical device of the present invention has an optical isolator function. The optical device of the present invention is a non-reciprocal optical part, and is an optical isolator or an optical circulator.

The optical device of the present invention is designed to operate, for example, in C-band (wavelength 1,530 nm to 1,565 nm) or L-band (wavelength 1,565 to 1,625 nm), each of which is an optical communication wavelength.

The dielectrics for use in the present invention are selected from materials that allow light of a wavelength to be used to be transmitted therethrough. The term "transparent" means allowing light of a wavelength to be used to be transmitted. In this application, for example, the wavelengths for optical communications are commercially expected; and to integrate as optical integrated circuits, $SiO_2$, MgO, $Al_2O_3$, $TiO_2$, or the like can be used as the first dielectric, and Si, AlGaAs, or the like can be used as the second dielectric.

The present invention relates to an optical device, such as an efficient optical isolator, utilizing surface plasmons propagating along an interface between a ferromagnetic substance and a dielectric. Since the magneto-optical constant of a ferromagnetic metal is high, the optical loss of surface plasmons in the ferromagnetic metal varies largely, depending on whether the plasmons propagate in a forward direction or a backward direction. The present invention uses the directional dependency of the optical loss of the surface plasmons. The optical device, such as the optical isolator, of the present invention uses dielectrics of at least two layers; one dielectric has a high refractive index and the other dielectric has a low refractive index. A plasmonic waveguide isolator using double-layered dielectrics has properties of a lower insertion loss and a higher optical isolation, as compared with a plasmonic waveguide isolator using a single-layer dielectric.

Some examples of embodiments of the present invention will be described below, with referring to the drawings.

A basic structure of the present invention will be described. FIG. 1 is a diagram for explaining a basic structure of a plasmonic waveguide of the present invention. The basic structure contains a layer of a ferromagnetic metal and two layers of dielectrics 1 and 2. The plasmonic waveguide of the present invention has, as shown in FIG. 1, a layered structure of three layers of a ferromagnetic metal layer, a first dielectric layer 1 being in contact with the ferromagnetic metal layer, and a second dielectric layer 2 being in contact with the first dielectric layer 1 on the opposite side to the ferromagnetic metal layer, and the refractive index of the second dielectric layer 2 is higher than that of the first dielectric layer 1. In other words, the refractive index of the layer of the first dielectric 1 is lower than that of the layer of the second dielectric 2. It is preferable to select materials in which the refractive index of the first dielectric layer 1 is much lower than that of the second dielectric layer 2. It is preferred that the difference in refractive index be 0.5 or more between the second dielectric layer 2 and the first dielectric layer 1. The first dielectric layer 1 and the second dielectric layer 2 are layers that allow light to be transmitted therethrough. The layered structure of at least three layers is required to effectively function as a plasmonic waveguide of the present invention, and the layers can take any of various shapes, as in the cases of the conventional waveguide structures. Furthermore, an additional layer(s) may be provided, in a usual manner, on the top and/or bottom of the layered structure for other purposes, such as protection.

FIG. 1 schematically shows a state in which plasmons propagate along an interface between the first dielectric layer 1 and the ferromagnetic metal layer. A wave-like arrow in the diagram schematically represents the plasmons, and a transversely convex solid line represents the intensity of the plasmons.

The operation of an optical isolator using the basic structure of the present invention will be described.

Light enters the layered structure of three layers, which is the basic structure. Specifically, in FIG. 1, incident light goes from left to right in the drawing. FIG. 1 is a cross-section in a light propagation direction of the waveguide. At the cross-section in a direction perpendicular to the light propagation direction, at least one of the ferromagnetic metal layer and the first and second dielectric layers is formed to have a predetermined width, thereby to confine the plasmons, which enables to form the waveguide. A magnetic field is applied to perpendicularly to the light propagation direction. When the direction in which the magnetic field is applied to is, as shown in FIG. 1, perpendicular to the drawing plane, and the direction thereof is one perpendicularly entering the drawing plane from above, an output is obtained. On the other hand, when the direction in which magnetic field is applied to is perpendicular to the drawing plane in FIG. 1, and the direction thereof is one perpendicularly coming out of the drawing plane from above, no output is obtained. The ferromagnetic metal layer has magnetization perpendicular to the propagation direction of the plasmons, and can control an optical isolation function by the direction of the magnetization.

The optical isolator of the present invention is an optical device having the function of transmitting light only in one direction and blocking light that is reflected in the midway and back-traveling. The principle of the basic structure of the present invention functioning as an isolator will be described. In the conventional, general longitudinal magneto-optical effect, when the light propagation direction is the z-direction, and the directions perpendicular thereto are the x- and y-directions, an electric-field vector of light rotates in the xy-plane, due to a magnetic field. Contrary to the above, the present invention utilizes a transverse magneto-optical effect. When an external magnetic field is applied to in the y-direction, a polarization of an evanescent wave rotates in the xz-plane. As such, the transverse magneto-optical effect occurs, by the electric-field vector of the polarized evanescent wave rotating around an axis that is parallel to the magnetic field and perpendicular to the propagation direction of light. The transverse magneto-optical effect is greater than the longitudinal magneto-optical effect. In contrast to the longitudinal magneto-optical effect, the transverse magneto-optical effect can be remarkably enhanced, by appropriately designing the device structure using the plasmonic effect.

According to the present invention, a high-performance optical device that can be integrated into optical integrated circuits can be provided. Further, according to the present invention, an optical isolator suitable for being integrated into optical integrated circuits can be provided. Further, according to the present invention, an optical device capable of using semiconductor substrates, such as Si, InP, and GaAs, can be provided. Further, according to the present invention, an optical device having properties high in optical isolation and low in insertion loss can be provided.

Since, in the present invention, use is made of the layered structure having the ferromagnetic metal layer and the double-layer dielectric, an efficient optical isolator function can be achieved, which utilizes surface plasmons propagating along an interface between the ferromagnetic metal layer and the dielectric layer. An optical device of the present invention has properties of a high optical isolation and a low insertion loss. A plasmonic waveguide of the present invention remarkably enhances the magneto-optical figure-of-merit, as compared to the conventional ones. While the conventional ones have a magneto-optical figure-of-merit of less than 10%, in the present invention a magneto-optical figure-of-merit of 10% or more is possible. Furthermore, in the present invention, one exhibiting a magneto-optical figure-of-merit FoM of 50% or more can be obtained.

Further, conventionally, when operating an optical isolator, an optical gain of a semiconductor optical amplifier or the like is required. On the other hand, according to the present invention, since a plasmonic-type optical isolator of the present invention has properties of a high optical gain and a low insertion loss, when operating the optical isolator, any optical gain or electrical activation is not required. Thus, a passive-type isolator that does not require any power consumption for its operation, can be realized.

Further, since the optical device of the present invention is suitable for being integrated into optical integrated circuits, the industrial effects are also large.

The present invention is described in more detail based on examples given below, but the invention is not limited by those.

EXAMPLES

First Embodiment

Figure 2:
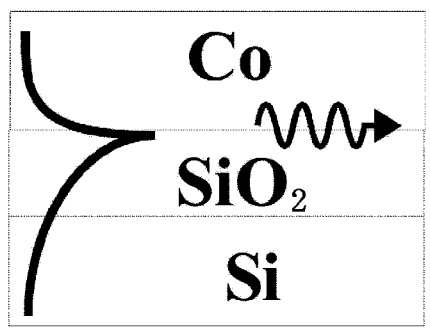
FIG. 2a) is a diagram showing a structure of a first embodiment, and FIG. 2b) is a graph showing a propagation distance where plasmons attenuate to 1/e (right-side vertical axis) and a magneto-optical figure-of-merit (left-side vertical axis), each to the layer thickness of $SiO_2$.
Figure 2:
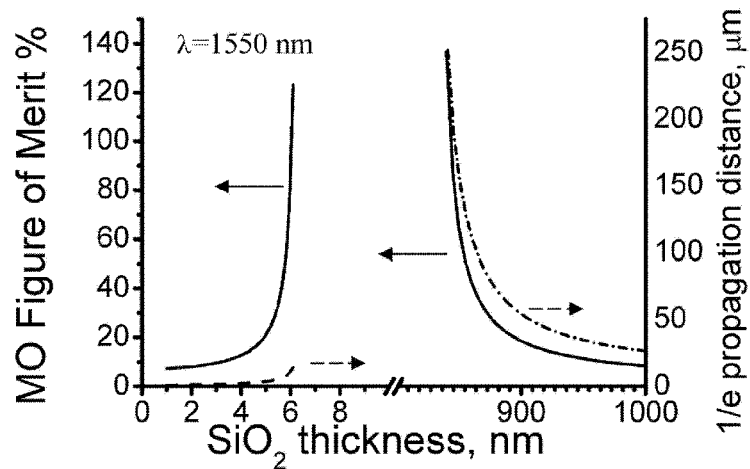

This embodiment relates to a plasmonic waveguide of three layers composed of $Co/SiO_2/Si$. This embodiment is described, with referring to FIGS. 2a) and 2b). FIG. 2a) is a diagram showing a structure of the plasmonic waveguide that was fabricated on a Si substrate. A $SiO_2$ layer was interposed between the Si substrate and a Co layer. FIG. 2b) is a graph showing the results of a propagation distance where plasmons attenuated to 1/e (right-side vertical axis) and a magneto-optical figure-of-merit (left-side vertical axis), each to the layer thickness of $SiO_2$. In FIG. 2a), a magnetic field was applied to perpendicularly to a propagation direction of the plasmons. FIG. 2a) is a diagram showing the case where light entered from left on the drawing plane, and the direction of magnetization of the ferromagnetic metal layer Co was one perpendicularly entering the drawing plane in FIG. 2a) (i.e. a forward direction). This is an example of using light of wavelength 1,550 nm. In FIG. 2b), an arrow of a dashed line, indicates to see the propagation distance (right-side vertical axis), and an arrow of a solid line indicates to see the magneto-optical figure-of-merit (left-side vertical axis). As shown in FIG. 2b), the plasmons propagated only when the layer thickness of $SiO_2$ was thinner than 6.1 nm or thicker than 840 nm. When the layer thickness of $SiO_2$ was a little bit thinner than 6.1 nm or a little bit thicker than 840 nm, the propagation distance where plasmons attenuated to 1/e became long, the optical loss of the plasmons was made low, and the magneto-optical figure-of-merit was made quite high and exceeded 50% and reached 100% or more (140% in the graph). This fact that the magneto-optical figure-of-merit is remarkably enhanced is the important effect of the present invention. The thus-obtained magneto-optical figure-of-merit is sufficiently high to use the plasmons in an excellent optical isolator.

The structure shown in FIG. 2a) was formed by forming the $SiO_2$ layer on the Si substrate (single crystal), by a method in the same manner as used in the production technique of semiconductor devices, and forming the Co layer thereon, by sputtering or the like. Co may be patterned in a waveguide shape, or Si or $SiO_2$ may have a pattern of a waveguide-shape. Although the example is shown in which the layers were formed on the Si substrate, the performance of this embodiment can also be obtained, as long as a waveguide of a layered structure of three layers ($Co/SiO_2/Si$) at the cross section is at least formed.

As shown in FIG. 2b), a first dielectric layer ($SiO_2$ in this embodiment) has a specific layer thickness range where the plasmons do not propagate. This specific layer thickness range is called a "cutoff thickness". As shown in FIG. 2b), the thinner cutoff thickness is called a first cutoff thickness, and the thicker cutoff thickness is called a second cutoff thickness. The plasmonic waveguide of the present invention has excellent performance as an optical isolator, when the first dielectric layer ($SiO_2$ in this embodiment) is thinner than the first cutoff thickness (6.1 nm in this embodiment) or thicker than the second cutoff thickness (840 nm in this embodiment).

For example, the thickness of the first dielectric layer is enough to be 99% or less of the first cutoff thickness or 101% or more of the second cutoff thickness. In the case where the thickness of the first dielectric layer is thinner than the first cutoff thickness, when the thickness is 50% or more of the first cutoff thickness, the resultant optical device is excellent in the magneto-optical figure-of-merit. Further, it is preferred that the thickness of the first dielectric layer be from 56% to 99% of the first cutoff thickness, since the magneto-optical figure-of-merit exceeds 10%. It is more preferred that the thickness of the first dielectric layer be from 85% to 99% of the first cutoff thickness, since the magneto-optical figure-of-merit exceeds 30%. It is further preferred that the thickness of the first dielectric layer be from 90% to 99% of the first cutoff thickness, since the magneto-optical figure-of-merit exceeds 50%. On the other hand, in the case where the thickness of the first dielectric layer is thicker than the second cutoff thickness, when the thickness is 140% or less of the second cutoff thickness, the resultant optical device is excellent in the magneto-optical figure-of-merit. It is preferred that the thickness of the first dielectric layer be more than 100% but not more than 112% of the second cutoff thickness, since the magneto-optical figure-of-merit exceeds 10%. It is more preferred that the thickness of the first dielectric layer be more than 100% but not more than 103% of the second cutoff thickness, since the magneto-optical figure-of-merit exceeds 30%. It is further preferred that the thickness of the first dielectric layer be more than 100% but not more than 101% of the second cutoff thickness, since the magneto-optical figure-of-merit exceeds 50%.

FIGS. 2a) and 2b) show the case where the wavelength of light was 1,550 nm, but the first and second cutoff thicknesses become somewhat higher or lower, depending on the wavelength. It is preferable to set the layer thickness of the first dielectric layer, according to the optical communication wavelength band. For example, it is preferable that the layer thickness of the first dielectric layer be 800 to 1,000 nm or 4 to 8 nm.

Second Embodiment

Figure 3:
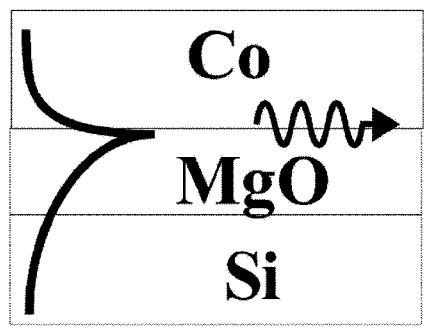
FIG. 3a) is a diagram showing a structure of a second embodiment, and FIG. 3b) is a graph showing a propagation distance where plasmons attenuate to 1/e (right-side vertical axis) and a magneto-optical figure-of-merit (left-side vertical axis), each to the layer thickness of MgO.
Figure 3:
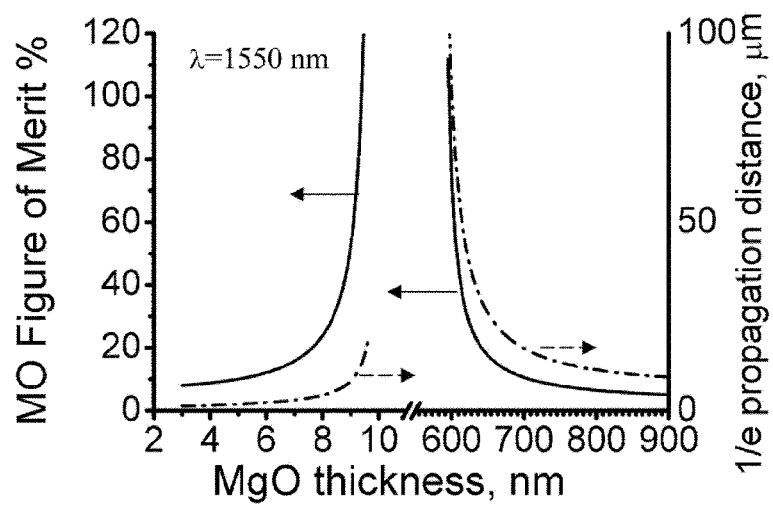

This embodiment relates to a plasmonic waveguide of three layers composed of Co/MgO/Si. This embodiment is described, with referring to FIGS. 3a) and 3b). FIG. 3a) is a diagram showing a structure of the plasmonic waveguide that was fabricated on a Si substrate. A MgO layer was interposed between the Si substrate and a Co layer. FIG. 3b) is a graph showing the results of a propagation distance where plasmons attenuated to 1/e (right-side vertical axis) and a magneto-optical figure-of-merit (left-side vertical axis), each to the layer thickness of MgO. Similar to the first embodiment, in FIG. 3a), a magnetic field was applied to perpendicularly to a propagation direction of the plasmons. This is an example of using light of wavelength 1,550 nm. When the layer thickness of MgO approached the range of from 9.6 nm to 595 nm, the magneto-optical figure-of-merit sharply enhanced. In this embodiment, the plasmonic waveguide has an excellent performance as an optical isolator, when the first dielectric layer (MgO in this embodiment) is thinner than the first cutoff thickness (9.6 nm in this embodiment) or thicker than the second cutoff thickness (595 nm in this embodiment).

The first dielectric layer can be set in the same manner as in the first embodiment. In the case where the thickness of the first dielectric layer is thinner than the first cutoff thickness, when the thickness is 50% or more of the first cutoff thickness, the resultant optical device is excellent in the magneto-optical figure-of-merit. Further, it is preferred that the thickness of the first dielectric layer be from 56% to 99% of the first cutoff thickness, since the magneto-optical figure-of-merit exceeds 10%. It is more preferred that the thickness of the first dielectric layer be from 85% to 99% of the first cutoff thickness, since the magneto-optical figure-of-merit exceeds 30%. It is further preferred that the thickness of the first dielectric layer be from 93% to 99% of the first cutoff thickness, since the magneto-optical figure-of-merit exceeds 50%. On the other hand, in the case where the thickness of the first dielectric layer is thicker than the second cutoff thickness, when the thickness is 140% or less of the second cutoff thickness, the resultant optical device is excellent in the magneto-optical figure-of-merit. It is preferred that the thickness of the first dielectric layer be more than 100% but not more than 118% of the second cutoff thickness, since the magneto-optical figure-of-merit exceeds 10%. It is more preferred that the thickness of the first dielectric layer be more than 100% but not more than 105% of the second cutoff thickness, since the magneto-optical figure-of-merit exceeds 30%. It is further preferred that the thickness of the first dielectric layer be more than 100% but not more than 103% of the second cutoff thickness, since the magneto-optical figure-of-merit exceeds 50%.

FIGS. 3a) and 3b) show the case where the wavelength of light was 1,550 nm, but the first and second cutoff thicknesses become somewhat higher or lower, depending on the wavelength. It is preferable to set the layer thickness of the first dielectric layer, according to the optical communication wavelength band. For example, it is preferable that the layer thickness of the first dielectric layer be 7 to 10 nm or 550 to 700 nm.

Although FIGS. 3a) and 3b) show an example utilizing the MgO layer, similar results were obtained when $Al_2O_3$ was used in place of MgO.

Third Embodiment

Figure 4:
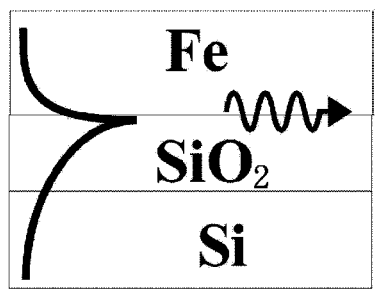
FIG. 4a) is a diagram showing a structure of a third embodiment, and FIG. 4b) is a graph showing a propagation distance where plasmons attenuate to 1/e (right-side vertical axis) and a magneto-optical figure-of-merit (left-side vertical axis), each to the layer thickness of $SiO_2$.
Figure 4:
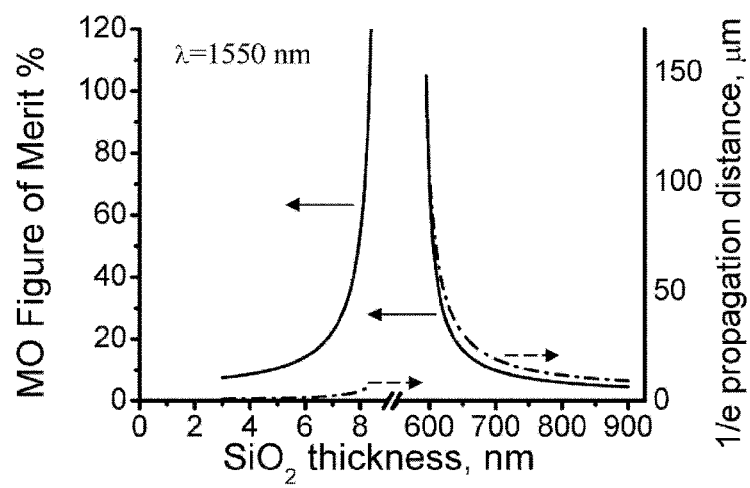

This embodiment relates to a plasmonic waveguide of three layers composed of $Fe/SiO_2/Si$. This embodiment is described, with referring to FIGS. 4a) and 4b). FIG. 4a) is a diagram showing a structure of the plasmonic waveguide that was fabricated on a Si substrate. A $SiO_2$ layer was interposed between the Si substrate and a Fe layer. FIG. 4b) is a graph showing the results of a propagation distance where plasmons attenuated to 1/e (right-side vertical axis) and a magneto-optical figure-of-merit (left-side vertical axis), each to the layer thickness of the $SiO_2$ layer. Similar to the first embodiment, in FIG. 4a), a magnetic field was applied to perpendicularly to a propagation direction of the plasmons. This is an example of using light of wavelength 1,550 nm. When the layer thickness of the $SiO_2$ layer approached the range of from 8.4 nm to 600 nm, the magneto-optical figure-of-merit sharply enhanced. In this embodiment, the plasmonic waveguide has an excellent performance as an optical isolator, when the first dielectric layer ($SiO_2$ in this embodiment) is thinner than the first cutoff thickness (8.4 nm in this embodiment) or thicker than the second cutoff thickness (600 nm in this embodiment).

The first dielectric layer can be set in the same manner as in the first embodiment. In the case where the thickness of the first dielectric layer is thinner than the first cutoff thickness, when the thickness is 50% or more of the first cutoff thickness, the resultant optical device is excellent in the magneto-optical figure-of-merit. Further, it is preferred that the thickness of the first dielectric layer be from 60% to 99% of the first cutoff thickness, since the magneto-optical figure-of-merit exceeds 10%. It is more preferred that the thickness of the first dielectric layer be from 87% to 99% of the first cutoff thickness, since the magneto-optical figure-of-merit exceeds 30%. It is further preferred that the thickness of the first dielectric layer be from 95% to 99% of the first cutoff thickness, since the magneto-optical figure-of-merit exceeds 50%. On the other hand, in the case where the thickness of the first dielectric layer is thicker than the second cutoff thickness, when the thickness is 140% or less of the second cutoff thickness, the resultant optical device is excellent in the magneto-optical figure-of-merit. It is preferred that the thickness of the first dielectric layer be more than 100% but not more than 113% of the second cutoff thickness, since the magneto-optical figure-of-merit exceeds 10%. It is more preferred that the thickness of the first dielectric layer be more than 100% but not more than 103% of the second cutoff thickness, since the magneto-optical figure-of-merit exceeds 30%. It is further preferred that the thickness of the first dielectric layer be more than 100% but not more than 102% of the second cutoff thickness, since the magneto-optical figure-of-merit exceeds 50%.

FIGS. 4a) and 4b) show the case where the wavelength of light was 1,550 nm, but the first and second cutoff thicknesses become somewhat higher or lower, depending on the wavelength. It is preferable to set the layer thickness of the first dielectric layer, according to the optical communication wavelength band. For example, it is preferable that the layer thickness of the first dielectric layer be 600 to 800 nm or 6 to 9 nm.

Fourth Embodiment

Figure 5:
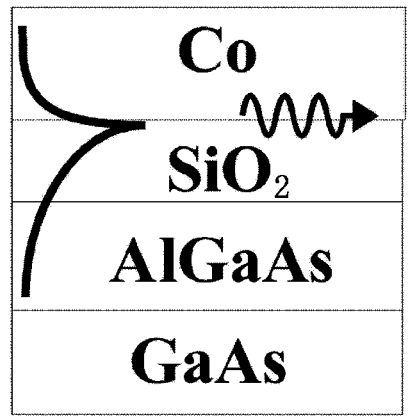
FIG. 5a) is a diagram showing a structure of a fourth embodiment, and FIG. 5b) is a graph showing a propagation distance where plasmons attenuate to 1/e (right-side vertical axis) and a magneto-optical figure-of-merit (left-side vertical axis), each to the layer thickness of $SiO_2$.
Figure 5:
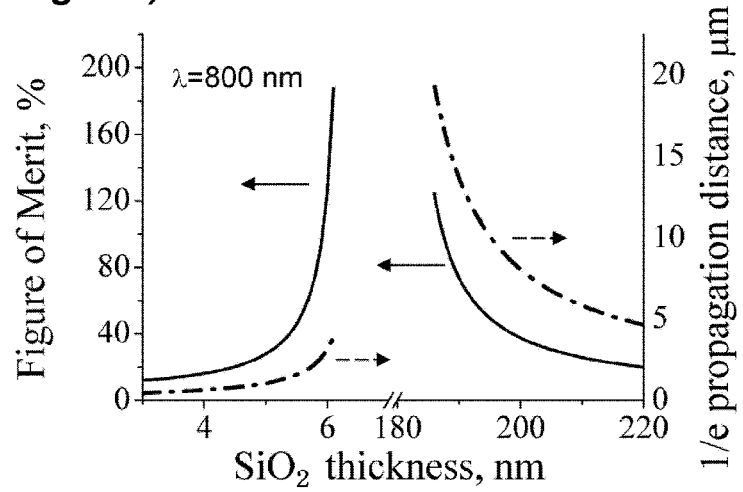

A plasmonic waveguide having three layers composed of Co/SiO$_2$/AlGaAs was fabricated and tested. This embodiment is described, with referring to FIGS. 5a) and 5b). FIG. 5a) is a diagram showing a structure of the plasmonic waveguide that was fabricated, by making a layer structure of an Al$_{0.5}$Ga$_{0.5}$As layer, a SiO$_2$ layer, and a Co layer, in this order, on a GaAs substrate. The SiO$_2$ layer was interposed between the Co layer and the Al$_{0.5}$Ga$_{0.5}$As layer. FIG. 5b) is a graph showing the results of a propagation distance where plasmons attenuated to 1/e (right-side vertical axis) and a magneto-optical figure-of-merit (left-side vertical axis), each to the layer thickness of the SiO$_2$ layer. Similar to the first embodiment, in FIG. 5a), a magnetic field was applied to perpendicularly to a propagation direction of the plasmons. This is an example of using light of wavelength 800 nm. When the layer thickness of the SiO$_2$ layer approached the range of from 6 nm to 185 nm, the magneto-optical figure-of-merit sharply enhanced. In this embodiment, the plasmonic waveguide has an excellent performance as an optical isolator, when the first dielectric layer (SiO$_2$) is thinner than the first cutoff thickness (6 nm in this embodiment) or thicker than the second cutoff thickness (185 nm in this embodiment). The magneto-optical figure-of-merit exceeded 100% and reached near about 200%.

Separately, a plasmonic waveguide having three layers composed of Fe/MgO/AlGaAs (e.g. Al$_{0.5}$Ga$_{0.5}$As) was fabricated and tested. This is an example of using light of wavelength 800 nm. When the layer thickness of the MgO layer approached the range of from 14 nm to 110 nm, the magneto-optical figure-of-merit sharply enhanced. This plasmonic waveguide has an excellent performance as an optical isolator, when the first dielectric layer (MgO) is thinner than the first cutoff thickness (14 nm) or thicker than the second cutoff thickness (110 nm). The magneto-optical figure-of-merit exceeded 100% and reached near about 200%.

Fifth Embodiment

Figure 6:
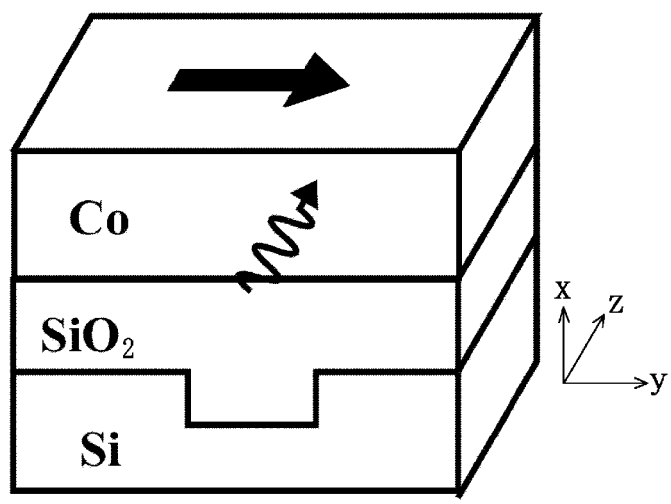
FIG. 6 is a diagram showing a structure of a fifth embodiment.

This embodiment is described, with referring to FIG. 6. This embodiment relates to a rib-type plasmonic waveguide. FIG. 6 is a cross-sectional view of the rib-type plasmonic waveguide of this embodiment. This embodiment provides a plasmonic waveguide having layers with the same compositions as those in the first embodiment, and composed of Co/SiO$_2$/Si, but the structure of the waveguide is embodied. The direction in which light entered, i.e. the incident light direction, is the z-direction, the magnetization direction is the y-direction, and the layered direction, i.e. the direction perpendicular to the layer faces, is the x-direction. As shown in FIG. 6, a groove extending in a waveguide longitudinal direction (in the figure, the z-direction, a propagation direction of plasmons) was provided in a part of the Si layer, and a part of the SiO$_2$ layer was embedded in the groove. Namely, the structure is that SiO$_2$ was half-embedded, and the ferromagnetic metal Co layer was formed on the SiO$_2$ layer. As shown in FIG. 6, a Si rib was provided, to confine the plasmons in a transverse direction (y-direction). The rib was 200 nm to 500 nm in width and 10 nm to 150 nm in height. The size of the rib (width, height, and length in the z-direction) is adjusted to cause effective coupling between the Si thin wire optical waveguide and the plasmonic waveguide. Similar to the first embodiment, as shown by a thick arrow in FIG. 6, a magnetic field was applied to, in the direction (y-direction) perpendicularly to the propagation direction of the plasmons and in the plane of the ferromagnetic metal Co layer.

Sixth Embodiment

Figure 7:
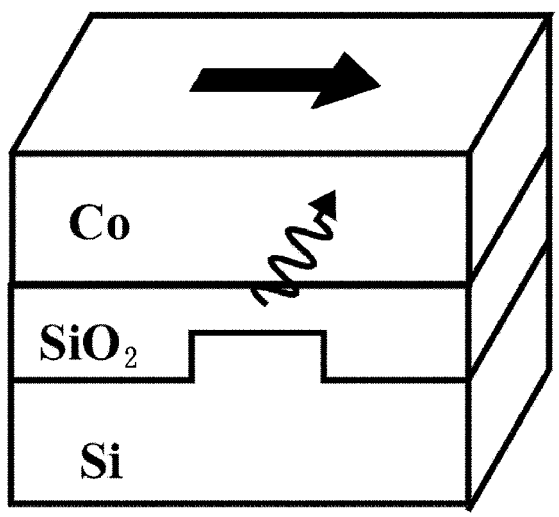
FIG. 7 is a diagram showing a structure of a sixth embodiment.

This embodiment is described, with referring to FIG. 7. This embodiment relates to another rib-type plasmonic waveguide. FIG. 7 is a cross-sectional view of the rib-type plasmonic waveguide of this embodiment. This embodiment provides a plasmonic waveguide, which had the layers with the same compositions as those in the first embodiment, and which was comprised of Co/SiO$_2$/Si, but which had a specific structure of the waveguide also different from that in the fifth embodiment. As shown in FIG. 7, a rib of a convex portion formed by a part of the Si layer extending in a waveguide longitudinal direction (a propagation direction of plasmons) was provided, the SiO$_2$ layer was formed thereon, and the ferromagnetic metal Co layer was further formed on the SiO$_2$ layer. As shown in FIG. 7, a Si rib was provided, to confine the plasmons in a transverse direction. The rib was 200 nm to 500 nm in width and 10 nm to 150 nm in height. The size of the rib (width, height, and length in the z-direction) is adjusted to cause effective coupling between the Si thin wire optical waveguide and the plasmonic waveguide. Similar to the first embodiment, as shown by a thick arrow in FIG. 7, a magnetic field was applied to, in the direction (y-direction) perpendicularly to the propagation direction of the plasmons and in the plane of the ferromagnetic metal Co layer.

Seventh Embodiment

Figure 8:
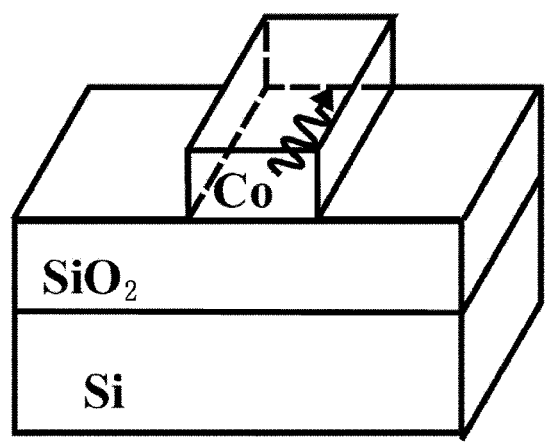
FIG. 8 is a diagram showing a structure of a seventh embodiment.

This embodiment is described, with referring to FIG. 8. This embodiment relates to still another rib-type plasmonic waveguide. FIG. 8 is a cross-sectional view of the rib-type plasmonic waveguide of this embodiment. This embodiment provides a plasmonic waveguide, which had the layers with the same compositions as those in the first embodiment, and which was comprised of Co/SiO$_2$/Si, but which had a specific structure of the waveguide different from those in the fifth and sixth embodiments. As shown in FIG. 8, the SiO$_2$ layer was formed on a flat face of the Si layer, and the rib-type ferromagnetic metal Co layer was further formed on the SiO$_2$ layer. The ferromagnetic metal Co layer with a rectangular cross-section was formed, by etching or patterning so as to have a rib shape. As shown in FIG. 8, the Co rib was provided, to confine the plasmons in a transverse direction. The rib was 400 nm to 1,200 nm in width and 100 nm or more but 1,000 nm or less in height. The size of the rib (width, height, and length in the z-direction) is adjusted to cause effective coupling between the Si thin wire optical waveguide and the plasmonic waveguide. Similar to the first embodiment, a magnetic field was applied to, in the direction (y-direction) perpendicularly to the propagation direction of the plasmons and in the plane of the ferromagnetic metal Co layer.

Eighth Embodiment

Figure 9:
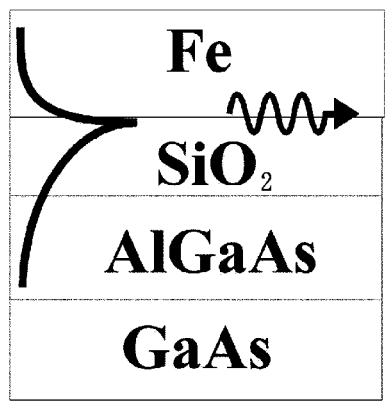
FIG. 9a) is a diagram showing a structure of an eighth embodiment, and FIG. 9b) is a graph showing a propagation distance where plasmons attenuate to 1/e (right-side vertical axis) and a magneto-optical figure-of-merit (left-side vertical axis), each to the layer thickness of SiO$_2$.
Figure 9:
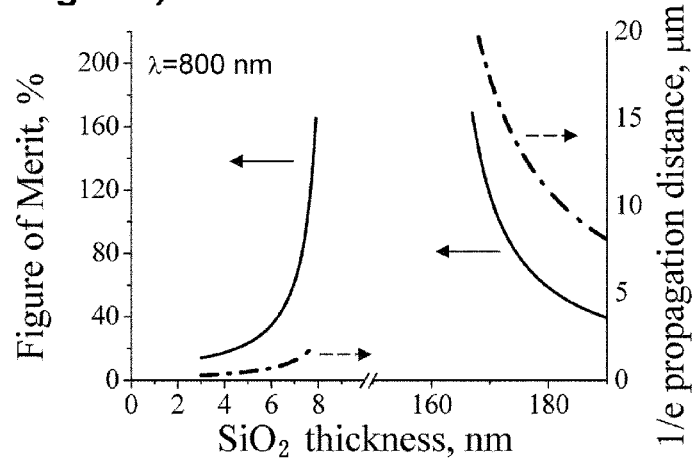

This embodiment relates to a plasmonic waveguide of three layers composed of Fe/SiO$_2$/AlGaAs. This embodiment is described, with referring to FIGS. 9*a*) and 9*b*). FIG. 9*a*) is a diagram showing a structure of the plasmonic waveguide that was fabricated, by making a layer structure of an AlGaAs layer, a SiO$_2$ layer, and a Fe layer, in this order, on a GaAs substrate. The SiO$_2$ layer was interposed between the Fe layer and the AlGaAs layer. FIG. 9*b*) is a graph showing the results of a propagation distance where plasmons attenuated to 1/e (right-side vertical axis) and a magneto-optical figure-of-merit (left-side vertical axis), each to the layer thickness of the SiO$_2$ layer. Similar to the first embodiment, in FIG. 9*a*), a magnetic field was applied to perpendicularly to a propagation direction of the plasmons. This is an example of using light of wavelength 800 nm. When the layer thickness of the SiO$_2$ layer approached the range of from 8 nm to 167 nm, the magneto-optical figure-of-merit sharply enhanced. In this embodiment, the plasmonic waveguide has an excellent performance as an optical isolator, when the first dielectric layer (SiO$_2$) is thinner than the first cutoff thickness (8 nm in this embodiment) or thicker than the second cutoff thickness (167 nm in this embodiment). The magneto-optical figure-of-merit exceeded 100% and reached near about 160%.

Figure 10:
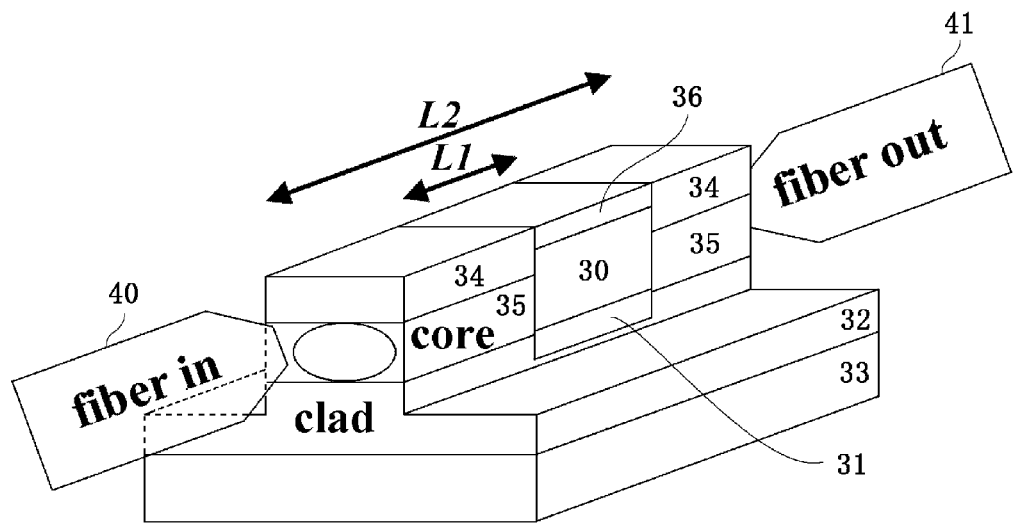
FIG. 10 is a diagram showing a structure of an optical device of the eighth embodiment.

In this embodiment, an optical device using the plasmonic waveguide, which was fabricated on the GaAs substrate, is described, with referring to FIG. 10. In this embodiment, the plasmonic waveguide (32, 31, and 30) was fabricated on the GaAs substrate 33, to demonstrate that the resultant plasmonic waveguide using the double-layer dielectric different in the refractive index from each other, had the effect of lowering the optical loss.

FIG. 10 is a diagram schematically showing the optical device (i.e. an optical isolator) into which the plasmonic waveguide was integrated. The plasmonic waveguide was monolithically formed so as to be integrated between two AlGaAs rib waveguides. The AlGaAs rib waveguides each function, to guide light into the plasmonic waveguide, and then to take the light out of the plasmonic waveguide. Each of the AlGaAs rib waveguides had an Al$_{0.5}$Ga$_{0.5}$As clad layer 32 and an Al$_{0.3}$Ga$_{0.7}$As waveguide core layer 35. A SiO$_2$ layer 34 was provided on the core layer 35, as a protective layer. The refractive index (3.434) of the core layer 35 was higher than by 1.98 than the refractive index (1.4533) of the clad layer 32.

The plasmonic waveguide had Al$_{0.5}$Ga$_{0.5}$As/SiO$_2$ (i.e. the second dielectric layer 32/the first dielectric layer 31), which were a double-layer dielectric; and the Fe layer as the ferromagnetic metal layer 30. A protective layer 36, e.g. a layer made of Au, was provided on the Fe layer. Since the refractive index (3.434) of Al$_{0.5}$Ga$_{0.5}$As was much higher than that (1.98) of SiO$_2$, it was possible to make the optical loss of the plasmons low, and to enhance the magneto-optical figure-of-merit. As the structure shown in the figure, in the structure in which the Fe layer 30 completely blocked the core layers 35, although incident light from one AlGaAs waveguide cannot propagate between the AlGaAs waveguides at the input and output sides, the light can propagate only by exciting the plasmons.

In this embodiment, a magnetic field was applied to in a direction perpendicular to a propagation direction of the plasmons and in the plane of the Fe layer.

In FIG. 10, a length L1 of the plasmonic waveguide (the length of the ferromagnetic metal layer) is, for example, 4 to 100 μm, and was made to 10 μm as an example in this embodiment. Further, a total distance L2 of the incident AlGaAs rib waveguide, the plasmonic waveguide, and the outgoing AlGaAs rib waveguide is, for example, 800 to 1,000 μm, and was made to 900 μm as an example in this embodiment. The thickness of the SiO$_2$ layer, which is the first dielectric layer 31, was 170 nm. The thickness of the plasmonic waveguide portion of Al$_{0.5}$Ga$_{0.5}$As, which is the second dielectric layer 32, was set to 200 nm, and the thickness of the Fe layer was set to 100 nm.

Light (wavelength 800 nm) entered the AlGaAs waveguide on the incident side from a lens fiber (incident fiber, or "fiber in" in the FIG. 40, and was guided into the plasmonic waveguide. Thus, the plasmons were excited by the light from the AlGaAs waveguide on the outgoing side. The thus-excited plasmons propagated through the plasmonic waveguide, to excite a waveguide mode of the AlGaAs waveguide on the outgoing side. The AlGaAs waveguide on the outgoing side allowed the light from the plasmonic waveguide to enter an outgoing fiber 41 (or "fiber out" in the figure). To estimate optical loss, the transmission ratio of light from the incident fiber 40 to the outgoing fiber 41 was measured, using a plurality of plasmonic waveguides different in size (L1, the width of the waveguide 8 μm, 16 μm, 32 μm). It was measured that TE polarized light cannot be transmitted through the plasmonic waveguide of this embodiment. The optical loss of the TM polarized light thus measured was about 0.05 to 0.09 dB/μm, which reveals a quite low optical loss. From the measurement results, it is demonstrated, by the structure of this embodiment, that, in the plasmonic waveguide, the plasmons to propagate are only TM polarized light and thus only TM-polarized plasmons allow light to propagate from the AlGaAs waveguide on the incident side to the AlGaAs waveguide on the outgoing side.

Comparative Example

Figure 11:
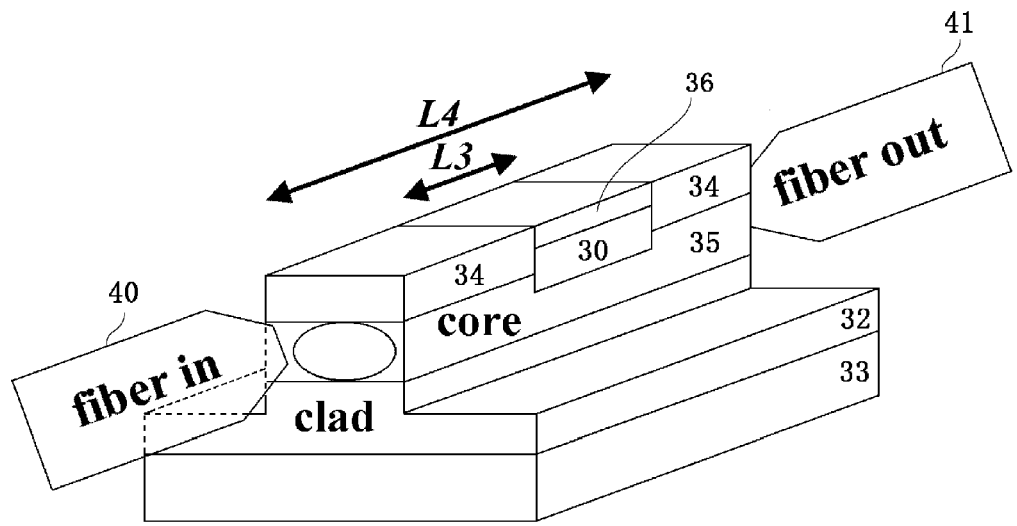
FIG. 11 is a diagram showing a structure of an optical device of Comparative example.
Figure 12:
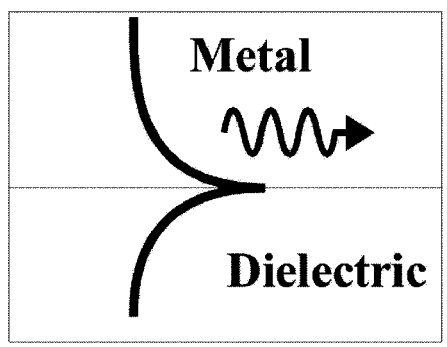
FIG. 12 is a diagram of a prior art showing an intensity of plasmons propagating along an interface between a metal and a dielectric.
Figure 13:
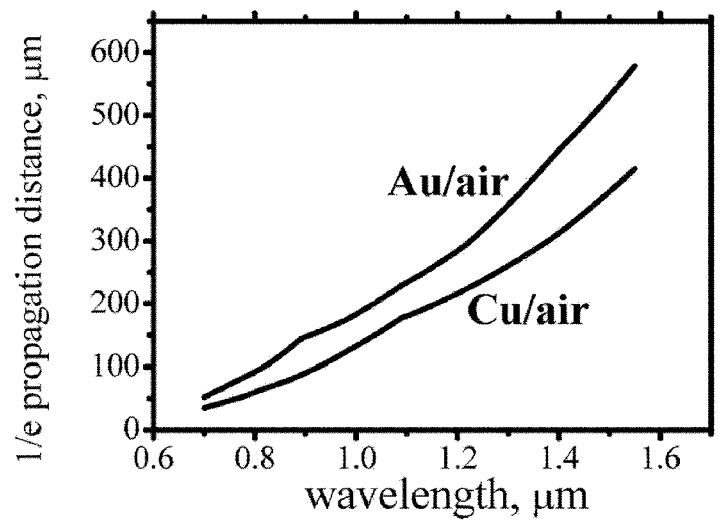
FIG. 13 is a diagram of a prior art showing a relationship between a wavelength and a propagation distance where plasmons propagating along an Au/air or Cu/air interface attenuate to 1/e.
Figure 14:
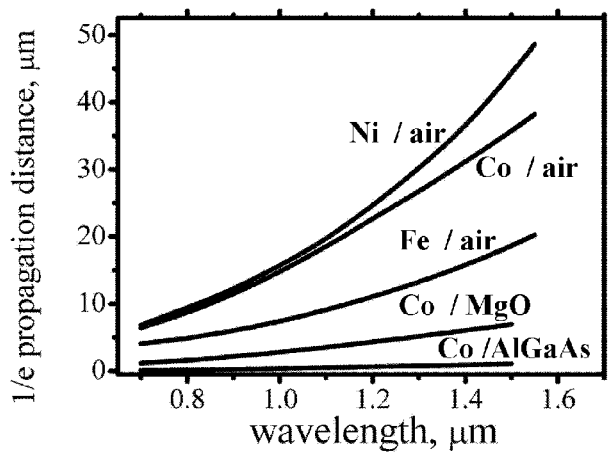
FIG. 14 is a diagram of a prior art showing a relationship between a wavelength and a propagation distance where plasmons propagating along an interface between a ferromagnetic metal and a dielectric (Fe/air, Co/air, Ni/air, Co/MgO, or Co/AlGaAs) attenuate to 1/e.
Figure 15:
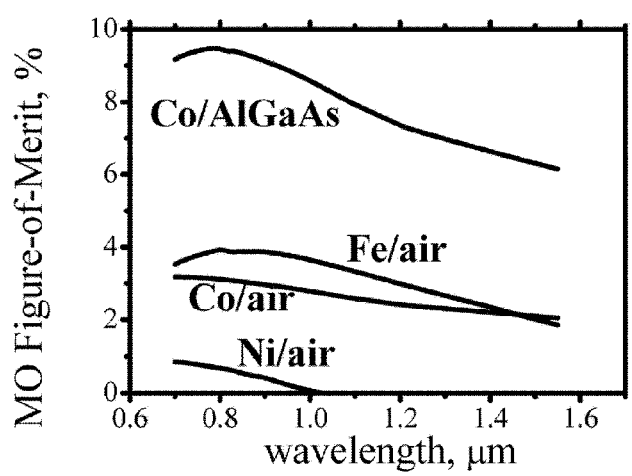
FIG. 15 is a diagram of a prior art showing a relationship between a magneto-optical figure-of-merit and a wavelength, in the case of plasmons propagating along an interface between a ferromagnetic metal and a dielectric (Fe/air, Co/air, Ni/air, or Co/AlGaAs).

To demonstrate lowering of the optical loss in the plasmonic waveguide, a test sample of Comparative example was fabricated and tested. FIG. 11 is a diagram showing the test sample of Comparative example. The test sample of Comparative example utilized, as shown in FIG. 11, a conventional dielectric waveguide covered with an Fe layer 30 of a ferromagnetic metal, without using the plasmonic waveguide of this embodiment (FIG. 10). In FIG. 11, a magnetic field was also applied to perpendicularly to a light propagation direction. In FIG. 11, as in FIG. 10, a length L3 of the ferromagnetic metal layer 30 is, for example, 4 to 100 μm, and was made to 50 μm in this Comparative example. Further, an end-to-end distance L4 of an AlGaAs rib waveguide on the incident side, the ferromagnetic metal layer 30, and an AlGaAs rib waveguide on the outgoing side is, for example, 800 to 1,000 μm, and was made to 900 μm in this Comparative example.

As shown in FIG. 11, the conventional dielectric waveguide covered with Fe had a structure different from the plasmonic waveguide of FIG. 10, and the Fe layer 30 was provided on an $Al_{0.3}Ga_{0.7}As$ waveguide core layer 35, without blocking the core layer 35. Based on this structure, it is expected that a waveguide mode would directly propagate from an AlGaAs waveguide on the incident side (an $Al_{0.5}Ga_{0.5}As$ clad layer 32 and the $Al_{0.3}Ga_{0.7}As$ waveguide core layer 35) to an AlGaAs waveguide on the outgoing side (the $Al_{0.5}Ga_{0.5}As$ clad layer 32 and the $Al_{0.3}Ga_{0.7}As$ waveguide core layer 35), and that the optical loss would be quite high, as compared to that of the case of propagation through the plasmonic waveguide (FIG. 10). The measurement result of the optical loss for the test sample of Comparative example (FIG. 11) was 0.38 dB/μm.

The resultant value of the optical loss for the test sample of Comparative example, is conspicuously higher, as compared to about 0.05 to 0.09 dB/μm which was the optical loss in the plasmonic waveguide of the eighth embodiment (FIG. 10). From the measurement results, it can be understood that the optical loss can be made low remarkably, only when a plasmonic waveguide has a structure comprised of: a double-layer dielectric, e.g. $Al_{0.5}Ga_{0.5}As/SiO_2$ in this embodiment; and a ferromagnetic metal, e.g. Fe in this embodiment. From this fact, it can be understood that a plasmonic waveguide having a layered structure comprised of a ferromagnetic metal layer and a double-layer dielectric, in which the refractive index of a first dielectric layer being in contact with the ferromagnetic metal layer is lower than that of a second dielectric layer, as in the present invention, is a highly efficient waveguide that makes the optical loss low remarkably.

Although, in the above embodiments, explanation is made on optical isolators, in addition thereto, the plasmonic waveguides of the embodiments can also be applied to other optical devices, such as optical circulators.

Having described our invention as related to the present embodiments, it is our intention that the invention not be limited by any of the details of the description, unless otherwise specified, but rather be construed broadly within its spirit and scope as set out in the accompanying claims.

The inventors of the present invention presented: V. Zayets, H. Saito, S. Yuasa, and K. Ando, "Enhancement of the transverse non-reciprocal magneto-optical effect", Journal of Applied Physics, 111, 023203 (2012), published online Jan. 23, 2012; and Vadym Zayets, Hidekazu Saito, Koji Ando, and Shinji Yuasa, "Optical Isolator Utilizing Surface Plasmons", Materials, 5, 857-871 (2012), published May 16, 2012, each of which is entirely herein incorporated by reference.

This non-provisional application claims priority under 35 U.S.C. §119 (a) on Patent Application No. 2012-150665 filed in Japan on Jul. 4, 2012, which is entirely herein incorporated by reference.

What is claimed is:

1. An optical device having a plasmonic waveguide, wherein the plasmonic waveguide has a layered structure of at least three layers in which a ferromagnetic metal layer, a first dielectric layer, and a second dielectric layer are layered in this order, wherein the first and second dielectric layers are layers that allow light to be transmitted therethrough, and wherein a refractive index of the second dielectric layer is higher than a refractive index of the first dielectric layer.

2. The optical device according to claim 1, wherein the first dielectric layer satisfies a predetermined thickness range condition that allows plasmons to propagate therethrough, in which a thickness of the first dielectric layer is thinner than a first cutoff thickness or thicker than a second cutoff thickness.

3. The optical device according to claim 1, wherein magnetization of the ferromagnetic metal layer is perpendicular to a propagation direction of plasmons.

4. The optical device according to claim 2, wherein the thickness of the first dielectric layer is 50 to 99% of the first cutoff thickness or 101 to 140% of the second cutoff thickness.

5. The optical device according to claim 1, wherein the ferromagnetic metal layer is composed of a metallic material of any of Co, Fe, Ni, FeCo, FeNi, FeCoB, SmCo, or NdFeB, as a main component.

6. The optical device according to claim 1, wherein the ferromagnetic metal layer is composed of Co, the first dielectric layer is composed of $SiO_2$, and the second dielectric layer is composed of Si, and a layer thickness of the first dielectric layer is 4 to 8 nm or 800 to 1,000 nm.

7. The optical device according to claim 1, wherein the ferromagnetic metal layer is composed of Co, the first dielectric layer is composed of MgO or $Al_2O_3$, and the second dielectric is composed of Si, and a layer thickness of the first dielectric layer is 7 to 10 nm or 550 to 700 nm.

8. The optical device according to claim 1, wherein the ferromagnetic metal layer is composed of Fe, the first dielectric layer is composed of $SiO_2$, and the second dielectric layer is composed of Si, and a layer thickness of the first dielectric layer is 6 to 9 nm or 600 to 800 nm.

9. The optical device according to claim 1, wherein the ferromagnetic metal layer is of a rib type, to confine plasmons in a transverse direction.

10. The optical device according to claim 1, wherein one of the first dielectric layer and the second dielectric layer has a shape of convex to embed a rib-type portion formed by the convex in the other of the first and second dielectric layers, thereby to confine plasmons in a transverse direction.

11. An optical isolator, comprising the optical device according to claim 1, which has an optical isolator function.

12. An optical isolator, comprising the optical device according to claim 2, which has an optical isolator function.

13. An optical isolator, comprising the optical device according to claim 3, which has an optical isolator function.

14. An optical isolator, comprising the optical device according to claim 4, which has an optical isolator function.

15. An optical isolator, comprising the optical device according to claim 5, which has an optical isolator function.

16. An optical isolator, comprising the optical device according to claim 6, which has an optical isolator function.

17. An optical isolator, comprising the optical device according to claim 7, which has an optical isolator function.

18. An optical isolator, comprising the optical device according to claim 8, which has an optical isolator function.

19. An optical isolator, comprising the optical device according to claim 9, which has an optical isolator function.

20. An optical isolator, comprising the optical device according to claim 10, which has an optical isolator function.

* * * * *